United States Patent [19]

Gurwicz

[11] Patent Number: 5,043,680
[45] Date of Patent: Aug. 27, 1991

[54] RESONANT CONVERTER OSCILLATOR USABLE FOR POWERING A MAGNETRON

[75] Inventor: David Gurwicz, Gateshead, United Kingdom

[73] Assignee: Aktiebolaget Electrolux, Stockhom, Sweden

[21] Appl. No.: 502,061

[22] Filed: Mar. 29, 1990

[30] Foreign Application Priority Data

Apr. 4, 1989 [GB] United Kingdom ............... 8907592

[51] Int. Cl.$^5$ ................................. H02M 7/5383
[52] U.S. Cl. ................... 331/86; 331/113 A; 331/117 FE; 331/185; 363/131
[58] Field of Search ................ 331/86-91, 331/113 A, 117 FE, 185, 186; 363/131, 132, 133

[56] References Cited

U.S. PATENT DOCUMENTS 4,677,345 6/1987 Nilssen ............... 331/113 A X
4,872,100 10/1989 Diaz .................... 363/132 X
4,873,408 10/1989 Smith et al. ............ 331/86 X

FOREIGN PATENT DOCUMENTS 0121917 10/1984 European Pat. Off. .

OTHER PUBLICATIONS

Sebastian et al., "Regulated Self-Oscillating Resonant Converters", Second European Conference on Power Electronics and Applications, Grenoble-France, Sep. 22-24, 1987, pp. 245-249.

Primary Examiner—Siegfried H. Grimm
Attorney, Agent, or Firm—Pearne, Gordon, McCoy & Granger

[57] ABSTRACT

A magnetron is powered via an output transformer TR whose primary winding (a) is connected in series with a resonant converter oscillator circuit comprising an inductor (L) and a capacitor (C3) and switching transistors ($T_1$, $T_2$) which are connected to positive and negative power supply terminals and are switched by respective current transformers (CT1, CT2). The switching points of the switching transistors are varied so as to vary the output of the circuit by varying the positive and negative flux excursions in the cores of the transformers (CT1, CT2) such that the net flux excursions are sufficient to saturate the transformers and switch off the switching transistors at a predetermined point in each half cycle. The relative positive and negative flux excursions in the transformer cores are controlled by providing additional windings (g) which are connected to a control circuit whcih rectifies the output of these windings and controls the rectified DC voltage appearing across them.

12 Claims, 7 Drawing Sheets

RESONANT CONVERTER OSCILLATOR USABLE FOR POWERING A MAGNETRON

BACKGROUND OF THE INVENTION

The present invention relates to oscillator circuits, and also relates to a magnetron powered by the rectified AC output of an oscillator circuit.

Figure 1:
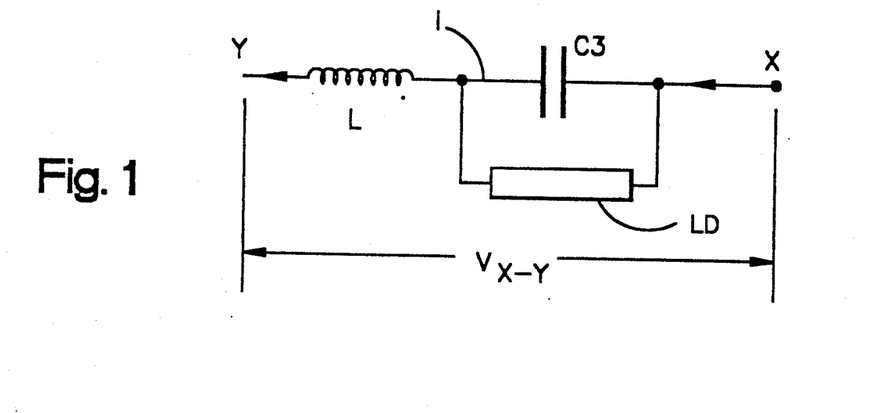
FIG. 1 is a circuit diagram showing a load energized from a oscillator circuit.

Referring to FIG. 1, which shows a series resonant circuit comprising an inductor L and a capacitor C3, it can be shown that the current in a resistive load LD, which is connected in parallel with capacitor C3, is independent of the load resistance when the current I is oscillating at the resonant frequency and is therefore in phase with the voltage $V_{X-Y}$. In such a case the current flowing in load LD can be expressed as $V_{X-Y}/\Omega L$ where $\Omega = 2\pi f$ where f is the resonant frequency. Thus, at resonance, such a circuit acts as a constant current source and is particularly suitable (after rectification) for powering non-linear loads such as a magnetron which has a zener characteristic.

A resonant converter is disclosed in EP-A-121,917 (published European Patent Application No. 0 121 917) and is used to energize a discharge tube. The principle of operation of this type of resonant converter is illustrated in the accompanying FIGS. 2A to 2F which are circuit diagrams illustrating the oscillating current flows in this type of circuit. FIGS. 2A to 2F have been simplified by omitting the transformers utilized to control switching transistors $T_1$ and $T_2$ and by omitting the load which is connected in parallel with capacitor C3.

Figure 2A:
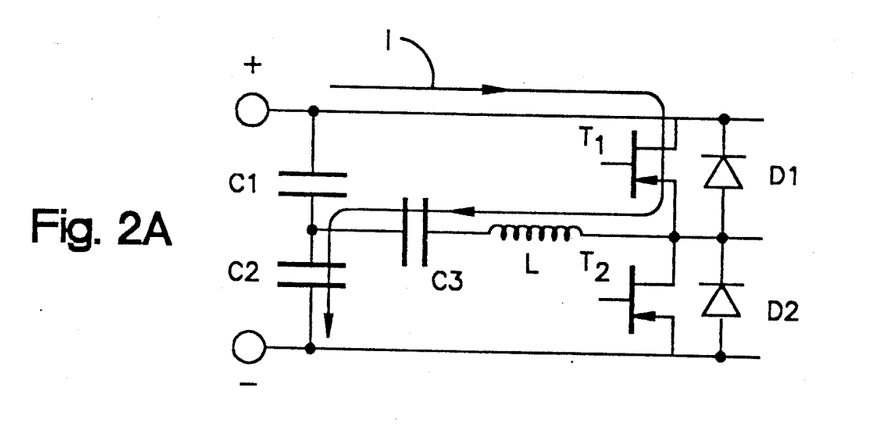
FIGS. 2A-2F show successive current flows in an oscillator circuit.
Figure 2B:
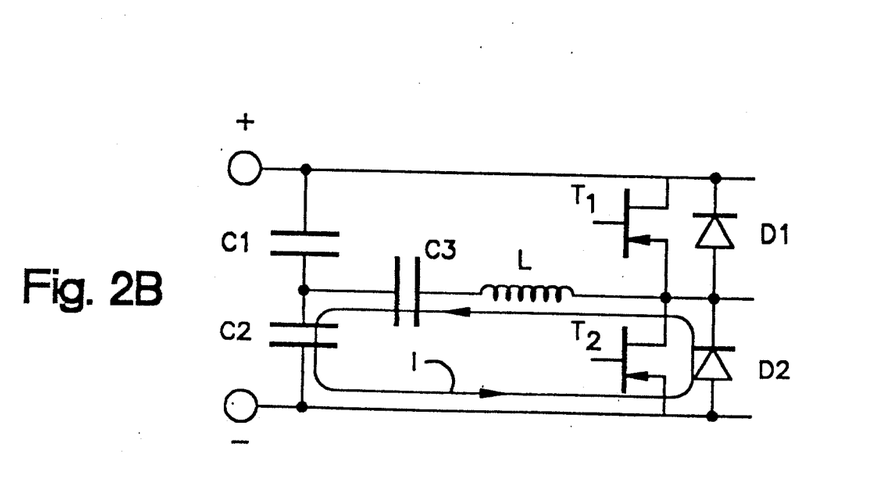
Figure 2C:
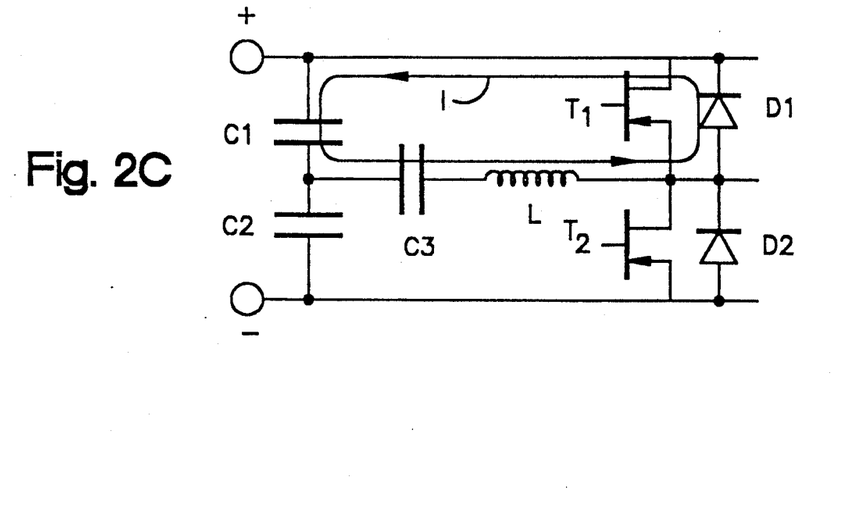
Figure 2D:
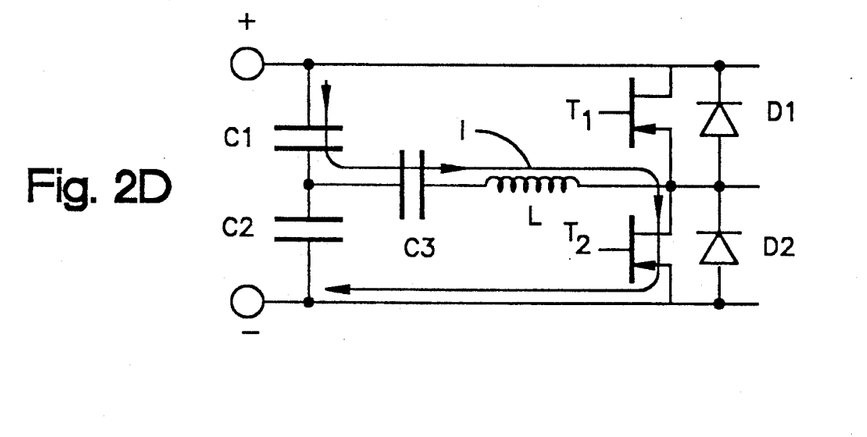

Referring to FIGS. 2A to 2F, it will be seen that the circuit comprises an inductor L and a capacitor C3 connected in series and gate-controlled switching means, namely, MOSFET's $T_1$ and $T_2$, connected to the free terminal of inductor L. The free terminal of capacitor C3 is connected to the positive power supply terminal via a capacitor C1 and to the negative power supply terminal by a capacitor C2. Switching transistor T1 is bypassed by a parasitic diode D1 and switching transistor T2 is bypassed by a parasitic diode D2, both parasitic diodes being poled in the opposite sense to the polarity of the power supply terminals. In each of FIGS. 2A to 2F the flow of current 1 is indicated. Current flow from right to left as shown in FIG. 2A is taken to be flow in the forward direction and, accordingly, current flow as shown in FIG. 2D is flow in the reverse direction.

Figure 4:
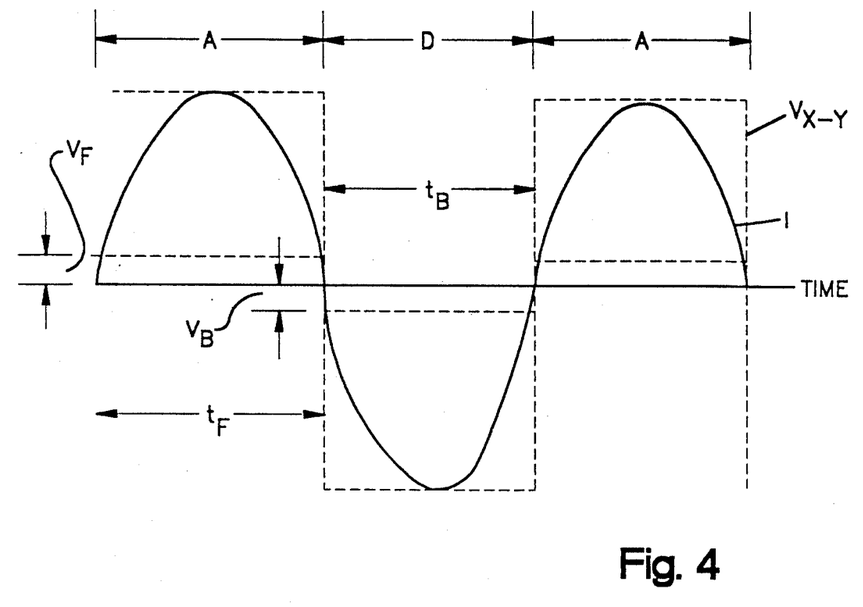
FIG. 4 is a plot of current and voltage wave form against time in one variant of the circuit shown in FIGS. 2A-2F.

If switching transistors $T_1$ to $T_2$ are switched at the zero crossing points of the current wave form, the circuit oscillates at the resonant frequency as shown in FIG. 4 which is a plot of the current wave form I and voltage wave form $V_{X-Y}$ (as defined in FIG. 1). It will be seen that the positive half cycles correspond to the current flow shown in FIG. 2A and that the negative half cycles correspond to the current flow shown in FIG. 2D.

Figure 2E:
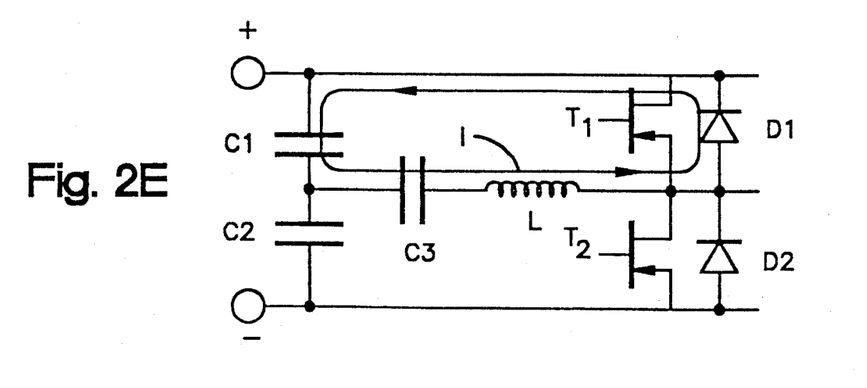
Figure 2F:
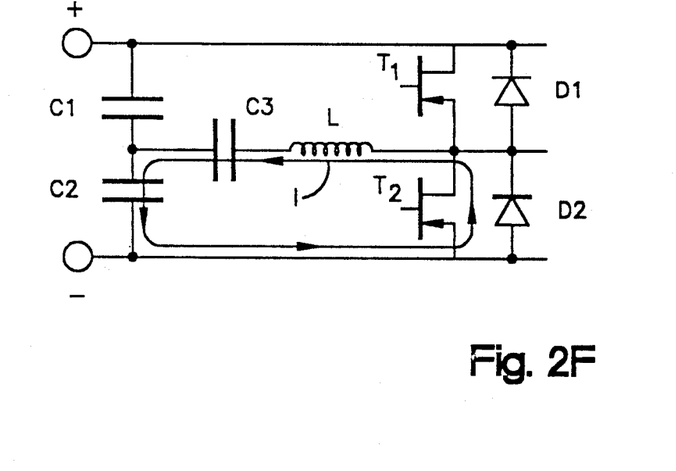
Figure 5:
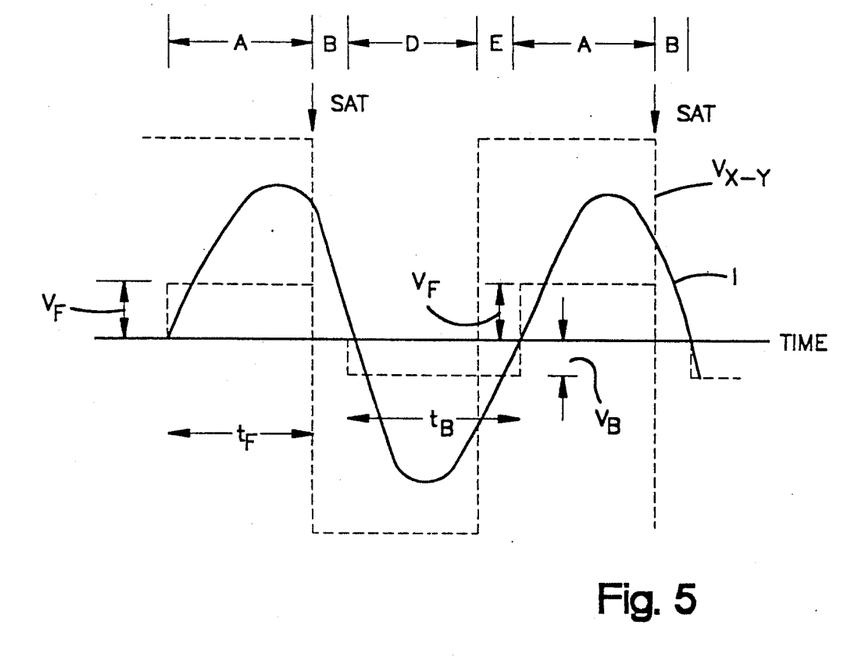
FIG. 5 is a plot of current and voltage wave form against time for another variant of the circuit shown in FIGS. 2A-2F.

In the more general case, as illustrated in FIG. 5, which is a plot of current I and voltage $V_{X-Y}$ of the circuit of FIGS. 2A to 2F, the switching transistors $T_1$ and $T_2$ are not switched at the zero crossing point of the current wave form and accordingly there is a phase difference between the current wave form and the voltage wave form $V_{X-Y}$. The periods corresponding to the current flows shown in FIGS. 2A, 2B, 2D and 2E are shown in FIG. 5. Referring now to FIGS. 2A to 2F, when switching transistor $T_1$ is switched on, current flow in the "forward" direction as shown in FIG. 2A occurs. On switching off transistor $T_1$, this current flow is continued in a loop through inductor L, capacitor C3, capacitor C2 and parasitic diode D2 as shown in FIG. 2B. The current flow in inductor L and capacitor C3 then reverses. If transistor $T_2$ is switched on as soon as the zero-crossing point of the current wave form is reached, then the current flow as shown in FIG. 2D occurs. However, in practice there is a slight delay (assumed to be negligible in FIG. 5), so that the initial reversal occurs through a loop consisting of capacitor C1, capacitor C3, inductor L and parasitic diode D1 as shown in FIG. 2C. The current flow shown in FIG. 2D is followed by a current flow in the forward direction through a loop consisting of capacitor C1, capacitor C3, inductor L and parasitic diode D1 as shown in FIG. 2E, as a result of transistor $T_2$ being switched off. This current flow gradually dies away until the zero-crossing point of the current wave form is reached. Assuming that transistor $T_1$ is switched on as soon as this zero-crossing point is reached, the forward current flow as shown in FIG. 2A then occurs. However, in practice, transistor $T_1$ will be switched on shortly after the zero-crossing point and in this intermediate condition between the zero-crossing point and the instant at which transistor $T_1$ is switched on, current flow in a loop as shown in FIG. 2F occurs, namely through inductor L, capacitor C3, capacitor C2 and parasitic diode D2.

It will be noted that the circuit disclosed in EP-A-121,917 is not controllable and can oscillate only at the resonant frequency as shown in FIG. 4 (already referred to).

However, a paper by Sebastian et al entitled "Regulated Self-Oscillating Resonant Converters", 2nd European Conference on Power Electronics and applications held at Grenoble, France 22–24 Sept. 1987 discloses in FIG. 6 a somewhat complex circuit which automatically switches the switching transistors in such a manner as to achieve non-resonant oscillation as shown in accompanying FIG. 5 (already referred to). By controlling the switching of transistors, the phase difference between the voltage and current wave forms can be controlled and this in turn controls the power output of the circuit.

The circuit disclosed by Sebastian utilizes saturable transformers whose primary windings are connected in series with the inductor and capacitor of the circuit and whose secondary windings are connected across the gate and source of the switching transistors. The drive is removed from the gates of the switching transistors when the saturable transformers saturate. The saturable transformers each incorporate additional windings through which a controlled direct current is fed. This controlled current is generated by an external circuit and generates an additional magnetizing force in each transformer core. It is implicit in the circuits disclosed by Sebastian et al that each transformer core saturates during each half cycle at an instant which is determined by the control current in the additional windings. By varying the control current flowing in the additional windings, the voltage gain and power output of the circuit can be controlled.

SUMMARY OF THE INVENTION

An object of the present invention is to provide an oscillator circuit arrangement in which an externally powered control circuit of the type disclosed in Sebastian et al is not required.

Accordingly, the invention provides an oscillator circuit arrangement comprising an inductor connected in series with a capacitor, positive and negative power supply terminals, first gate-controlled switching means arranged to conduct current from said terminals through said inductor and capacitor in the forward direction and second gate-controlled switching means arranged to conduct current from said terminals through said inductor and capacitor in the reverse direction, the gates of said switching devices being coupled to the secondary windings of respective saturable transformers which are arranged to switch on the switching devices alternately, each saturable transformer having a primary winding which carries the oscillating current produced by said circuit arrangement and having control means which is arranged to vary the ratio of forward magnetic flux excursion in the saturable transformer core due to current flow in said forward direction: reverse magnetic flux excursion in the saturable transformer core due to current flow in said reverse direction whereby in use, when said ratio is not equal to unity, net flux excursions occur in successive cycles until the saturable transformer core saturates in alternative half cycles only, whereby a phase difference is established between the output voltage and current wave forms of said circuit arrangement which is dependent upon said ratio.

The invention also provides a magnetron system comprising a magnetron energized by the rectified AC output of the above oscillator circuit arrangement.

The invention will now be described by way of example only with reference to FIGS. 1-8 of the accompanying drawings, of which:

FIGS. 1, 2, 4 and 5 have already been referred to.

DETAILED DESCRIPTION OF THE PREFERRED EMBODIMENT

The control circuit of the present invention differs fundamentally from the control circuit disclosed by Sebastian et al in that it is arranged to control the relative flux excursions in the saturable transformer cores, such that when the ratio of forward and reverse flux excursions is not equal to unity, net flux excursions occur in successive cycles until the saturable transformer core saturates in alternate half cycles only.

Figure 3:
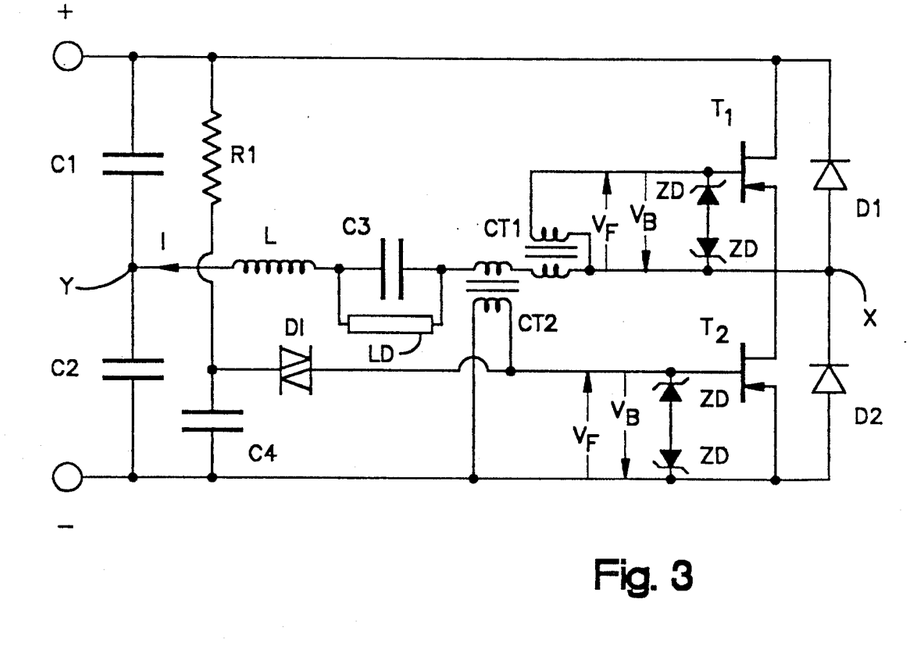
FIG. 3 is a circuit diagram of an oscillator circuit which illustrates the principle of the present invention.
Figure 6A:
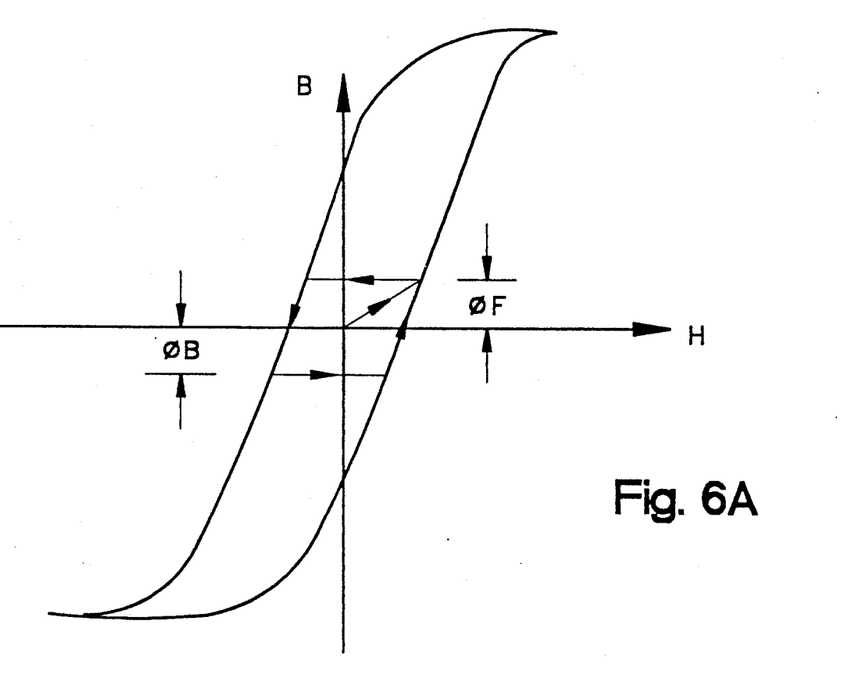
FIG. 6 shows plots of flux density B against magnetizing force H in the transformer cores of the circuit arrangement of the present invention.

This is illustrated in FIGS. 3 and 6.

Referring to FIG. 3, it will be noted that the circuit shown corresponds generally to the circuit shown in FIGS. 2A to 2F but includes current transformers CT1 and CT2 whose primaries are connected in series with inductor L and capacitor C3 and whose secondary windings are connected across the gate and source of switching transistors $T_1$ and $T_2$. Furthermore, in order to initiate oscillation in the circuit, the capacitor C4 is charged via a resistor R1 and fires a diac DI which is connected between the junction of C4 and R1 and the gate of switching transistor $T_2$. Furthermore, a load LD (such as a magnetron) is shown connected in parallel with capacitor C3.

The windings of transformers CT1 and CT2 are wound in such a sense that when current I is positive (i.e. flowing from right to left in FIG. 3) transistor $T_1$ is switched on and transistor $T_2$ is switched off, whereas when the current is flowing in the reverse direction, transistor $T_1$ is switched off and transistor $T_2$ is switched on. The secondary winding of each transformer is provided with a pair of zener diodes ZD connected back to back in series.

The flux $\phi$ in each transformer core is proportional to the integral:

$$\int V \, dt$$

where V is the voltage across the secondary winding and t is time. If the forward voltage drop across each pair of zener diodes ZD is $V_F$ and the corresponding reverse voltage drop is $V_B$, then the corresponding flux excursions $\phi_F$ and $\phi_B$ cancel in each cycle. This is illustrated in FIG. 6 (a). Accordingly, the saturation level is never reached and each transformer switches off its associated transistor $T_1$ or $T_2$ only at the zero crossing points of the current waveform. The voltage and current wave forms are shown in FIG. 4, which also shows the forward and reverse voltage drops across the second windings, namely $V_F$ and $V_B$ and the corresponding time intervals $T_F$ and $T_B$ during which these voltage drops occur.

Figure 6B:
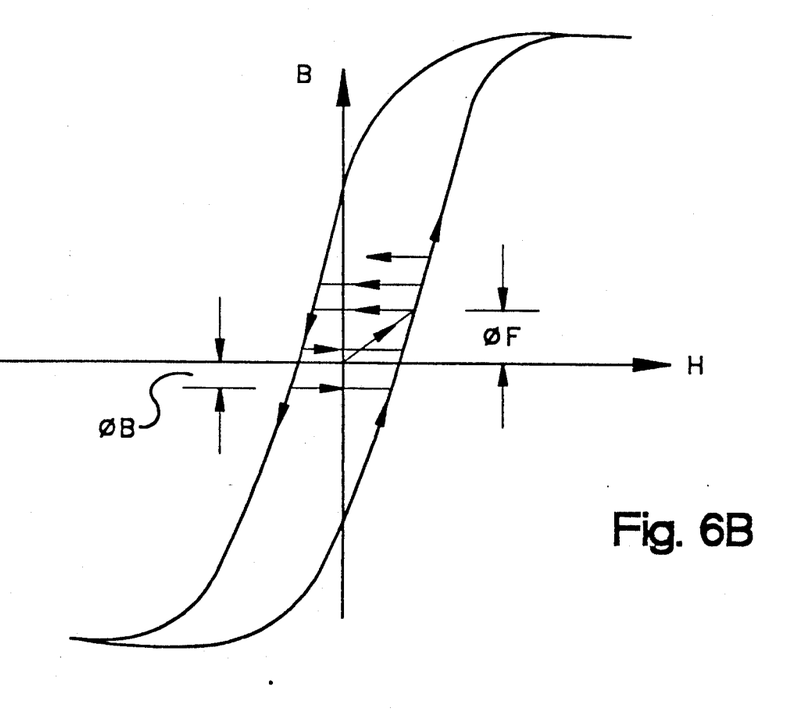

In accordance with the present invention, it is contemplated that $V_F$ and $V_B$ may be made unequal. In this case the corresponding flux excursions $\phi_F$ and $\phi_B$ in successive half cycles will also be unequal, as illustrated in FIG. 6(b). As shown, this results in a net increment in flux during each successive cycle, and after a few cycles the saturation flux density is reached, at which time the voltage in the secondary windings falls to zero.

This situation is illustrated in FIG. 5 (already referred to) which shows the forward voltage drop $V_F$ and the reverse voltage drop $V_B$ (assumed to be less than $V_F$) and the corresponding time periods $t_F$ and $t_B$. FIG. 5 also indicates that the transformer cores become saturated at the end of each period A in the cycle, period A being illustrated in FIG. 2A. It will be seen that the phase shift between the voltage and current wave forms is dependent upon the ratio $t_B$: $t_F$ which is in turn dependent on the ratio $V_B$: $V_F$; since $V_F \cdot t_F = V_B \cdot t_B$. It will be noted that this mode of operation is quite different from the operation of the Sebastian circuit in which a predetermined biasing flux is generated in the transformer core by means of a constant current passed through an additional winding. Such a biasing flux will have no effect on the net flux excursion in each cycle.

In a particularly simple form of the invention, it is envisaged that at least one zener diode ZD associated with each transformer CT1 and CT2 would be of the externally controllable type, such that its zener voltage drop is controllable.

Figure 7:
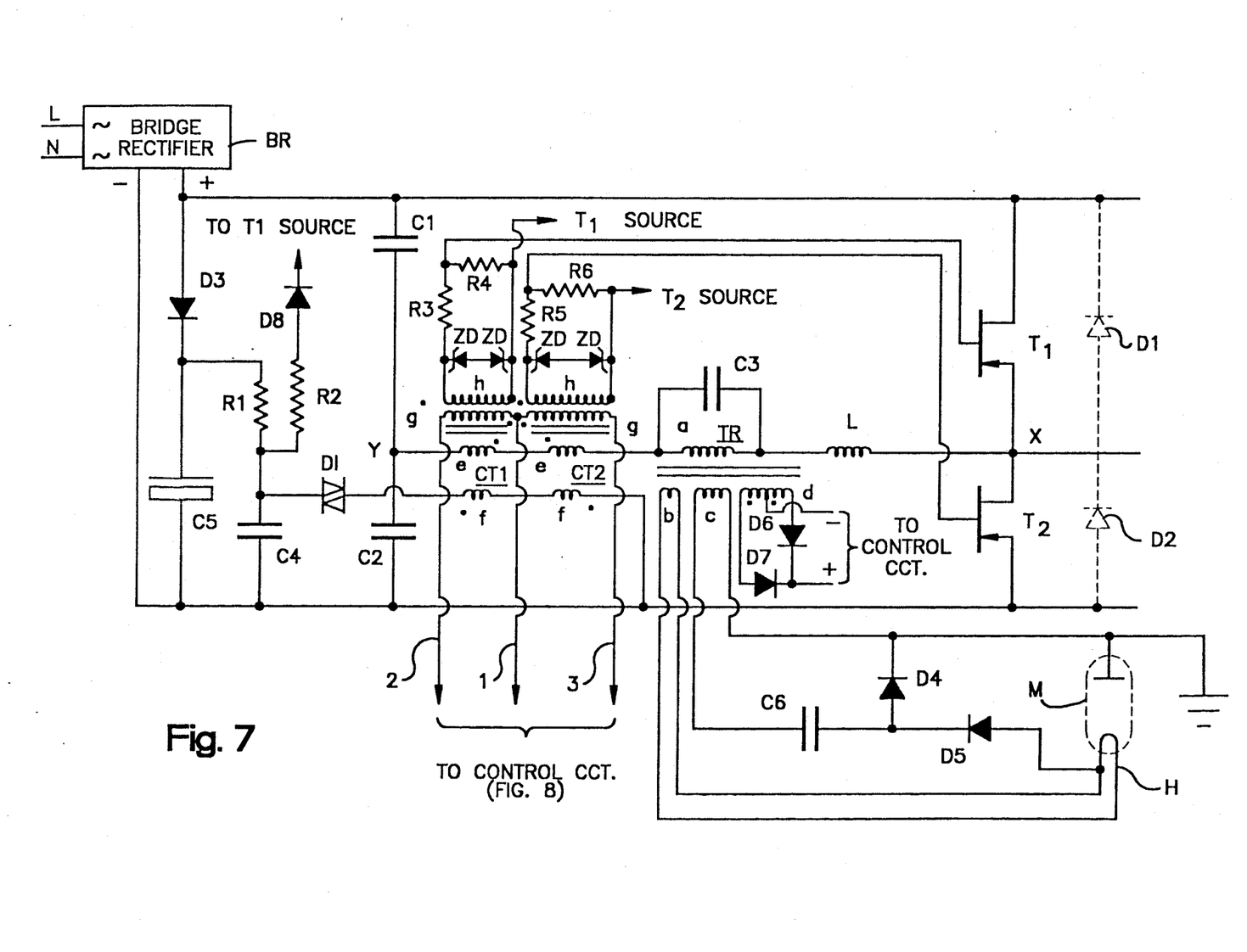
FIG. 7 is a partial circuit diagram of a magnetron system in accordance with the present invention.
Figure 8:
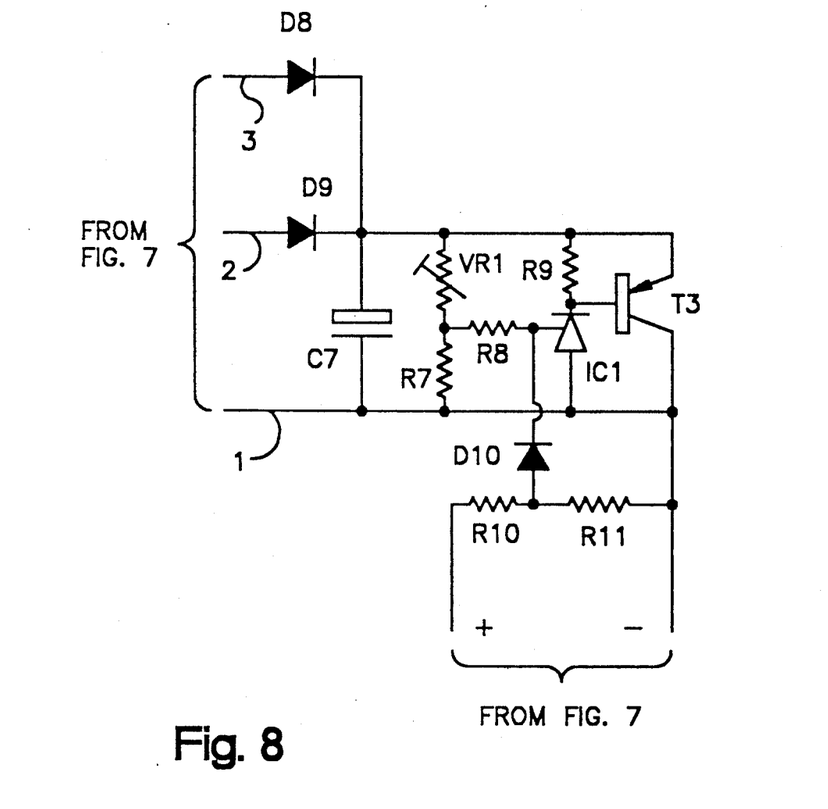
FIG. 8 is a circuit diagram showing the novel control circuitry of the present invention which is utilized to control the magnetron system of FIG. 7.

FIGS. 7 and 8 show a preferred embodiment of the invention in which the control circuit which controls the forward and reverse flux excursions in the transformer cores requires no external power supply.

The arrangement shown in FIG. 7 comprises a bridge rectifier BR which is fed with AC from the main conductors LN and feeds current to an oscillator circuit comprising inductor L, capacitor C3, MOSFET switching transistor $T_1$ and $T_2$ and additional capacitors C1 and C2. The resonant frequency of the circuit is determined principally by the inductance (typically 160 microhenries) of the inductor L and the capacitance (typicaly 0.47 microfarads) of the capacitor C3. The values of C1 and C2 are suitably 3.3 microfarads.

The output of the above oscillator circuit is fed to the primary winding a of an output transformer TR and the output of the secondary winding c of this transformer is fed to magnetron M in a conventional voltage doubling circuit comprising capacitor C6 and diodes D4 and D5. The heater H of the magnetron is energised by a separate secondary winding b of transformer TR.

The oscillator circuit includes two current transformers CT1 and CT2 which are connected in series with inductor L and capacitor C3. These current transformers each incorporate a saturable core of magnetizable material having a square hysteresis loop, such as "orthogonol" or "HCR" for example. It should be noted that when the circuit oscillates at the resonant frequency, the transformer cores do not saturate, however.

The arrangement includes a starter circuit of a conventional type, comprising a 47 microfarad capacitor C5 which is charged by a diode D3 and a series-connected resistor R1 and capacitor C4 which are connected between the junction of C5 and D3 and the negative pole of the power supply. A series-connected resistor R2 and diode D8 are connected between the junction of R1 and C4 and the source of transistor $T_1$. Furthermore, a diac DI is connected between the junction of R1 and C4 and to series-connected primary windings f of transformers CT1 and CT2 respectively. When the circuit is energized, a capacitor C4 charges up gradually at a rate determined by the RC constant of R1 and C4 and when its voltage reaches a predetermined level it fires diac DI which sends a pulse of current through windings f which are poled in such a manner as to generate a voltage across the gate and source of switching transistor $T_1$ which turns on this transistor. This initiates oscillation in the manner already described above with reference to FIGS. 2A-2F. Switching transistors $T_1$ and $T_2$ are each bypassed by parasitic diodes D1 and D2. These diodes are indicated in dashed lines because they are not discrete components but are incorporated within $T_1$ and $T_2$ respectively.

After oscillation has been started, transformers CT1 and CT2 are energized by current flowing in their primary windings e. An output voltage is generated in secondary windings h and it will be noted that the output voltage in CT1 is of opposite polarity to the output voltage of CT2, because primary windings e are wound in opposite senses whereas secondary windings h are wound in the same sense. Each secondary winding h incorporates two back-to back zener diodes ZD connected across its terminals and also incorporates two series-connected resistors (R3, R4 in the case of CT1 and R5, R6 in the case of CT2), the respective junctions of these pairs of resistors being connected to the gates of switching transistors $T_1$ and $T_2$ respectively. The drive circuits to the switching transistors are completed by connections between one end of each secondary winding h and the source of transistor $T_1$ (in the case of CT1) and the source of $T_2$ (in the case of CT2). Accordingly, when current is flowing from terminal X to terminal Y, the flux generated by primary windings e tends to turn on transistor $T_1$ and to turn off the transistor $T_2$. This situation is of course reversed when current flows from terminal Y to terminal X.

The zener diodes ZD limit the voltage drops across respective secondary windings 8 to approximately 20 volts in either direction, and accordingly, the cores of transformers CT1 and CT2 do not saturate when the flux excursions in them during successive half cycles are equal and opposite. As previously noted in connection with FIGS. 2A-2F and FIGS. 4 and 5, this condition occurs when the oscillator is running at the resonant frequency.

In order to control the power output of the oscillator circuit, two additional secondary windings g are provided on current transformers CT1 and CT2 which are wound in opposite senses and connected in series. The junction of these windings is connected to a conductor 1 and the free ends of these windings are connected to conductors 2 and 3 respectively which are connected to a control circuit (FIG. 8). The control circuit of FIG. 8 is also connected to the positive and negative output of a rectifier circuit which is powered by a secondary winding d of power output transformer TR. It will be seen that the positive terminal of this circuit is connected to the junction of two diodes D6 and D7 and that the negative terminal is connected to the mid point of winding d.

The operation of this control circuit will now be described with reference to FIG. 8. The conductors 2 and 3 from the free ends of additional windings g are connected to diodes D8 and D9 and a reservoir capacitor C7 is connected between conductor 1 and the junction of diodes D8 and D9. Accordingly, the voltage appearing across capacitor C7 is the voltage appearing across windings g of the current transformers CT1 and CT2. The flux excursion in the cores of transformers CT1 and CT2 is in turn dependent upon the product Vt in the additional windings g and accordingly the ratio of the successive flux excursions in the transformer cores due to forward and reverse current flow is dependent upon the voltage appearing across reservoir capacitor C7 (FIG. 8). This voltage is controlled by a regulator circuit comprising a TL431 shunt regulator IC1 which controls a power transistor T3. Transistor T3 discharges the capacitor C7 to a preset voltage determined by the ratio of variable resistor VR1 and resistor R7, the junction of these resistors being connected via a further resistor R8 to the control terminal of IC1. A resistor R9 is connected between the base and emitter of transistor T3.

Variable resistor VR1 is variable manually and controls the power output of transformer TR. It will be noted that the power output may be reduced to zero by setting VR1 to a value such that the phase difference between the voltage appearing across terminals X and Y (FIG. 7) and the current flowing between these terminals is 90°.

In order to limit the power output of the transformer TR when the heater circuit H of the magnetron M is warming up, the conductors from secondary winding d are connected to the control terminal of IC1 (FIG. 8)

via a diode D10 which is connected to the junction of series connected resistors R10 and R11.

Until the magnetron heater H has warmed up and electrons emitted, the magnetron M is an open circuit and high voltages appear across the transformer primary a. These voltages are sensed by winding 'd', attenuated by resistors R10 and R11 and fed into the control input of IC1, turning on T3 and reducing the power fed into the resonant circuit, keeping the system under control.

I claim:

1. An oscillator circuit arrangement comprising an inductor connected in series with a capacitor, positive and negative power supply terminals, first gate-controlled switching means arranged to conduct current from said terminals through said inductor and capacitor in the forward direction and second gate-controlled switching means arranged to conduct current from said terminals through said inductor and capacitor in the reverse direction, the gates of said switching means being coupled to the secondary windings of respective saturable transformers which are arranged to switch on the switching means alternately, each saturable transformer having a primary winding which carries the oscillating current produced by said circuit arrangement and having control means which is arranged to vary the ratio of forward magnetic flux excursion in the saturable transformer core due to current flow in said forward direction to reverse magnetic flux excursion in the saturable transformer core due to current flow in said reverse direction whereby in use, when said ratio is not equal to unity, net flux excursions occur in successive cycles until the saturable transformer core saturates in alternate half cycles only, whereby a phase difference is established between the output voltage and current wave forms of said circuit arrangement which is dependent upon said ratio.

2. An oscillator circuit arrangement as claimed in claim 1 wherein said control means comprises an additional winding coupled to said saturable core, rectifying means connected in series with said additional winding, and regulating means connected to the output of said rectifying means and arranged to set the DC voltage drop in said additional winding and thereby to set said ratio.

3. An oscillator circuit arrangement as claimed in claim 2 wherein said regulating means is energized solely by the output of said additional winding.

4. An oscillator circuit arrangement as claimed in any preceding claim wherein each of said switching means is bypassed by a respective diode.

5. A magnetron system comprising a resonant converter oscillator circuit having an A.C. output coupled to rectifying means, said rectifying means having a D.C. output, and a magnetron coupled to said D.C. output of said rectifying means, said resonant converter oscillator circuit comprising an inductor connected in series with a capacitor, positive and negative power supply terminals, first gate-controlled switching means arranged to conduct current from said terminals through said inductor and capacitor in the forward direction and second gate-controlled switching means arranged to conduct current from said terminals through said inductor and capacitor in the reverse direction, the gates of said switching means being coupled to the secondary windings of respective saturable transformers which are arranged to switch on the switching means alternately, each saturable transformer having a primary winding which carries the oscillating current produced by said circuit arrangement and having control means which is arranged to vary the ratio of forward magnetic flux excursion in the saturable transformer core due to current flow in said forward direction to reverse magnetic flux excursion in the saturable transformer core due to current flow in said reverse direction whereby in use, when said ratio is not equal to unity, net flux excursions occur in successive cycles until the saturable transformer core saturates in alternate half cycles only, whereby a phase difference is established between the output voltage and current wave forms of said resonant converter oscillator circuit.

6. A magnetron system as claimed in claim 5, wherein said control means comprises an additional winding coupled to said saturable core, rectifying means connected in series with said additional winding, and regulating means connected to the output of said rectifying means and arranged to set the D.C. voltage drop in said additional winding and thereby to set said ratio.

7. A magnetron system as claimed in claim 6, wherein said regulating means is energized solely by the output of said additional winding.

8. A magnetron system as claimed in claim 5, wherein each of said switching means is bypassed by a respective diode.

9. A magnetron system as claimed in claim 5, wherein said rectifying means is connected to a secondary winding of a transformer having a primary winding connected in parallel with said capacitor.

10. A magnetron system as claimed in claim 6, wherein said magnetron is provided with a heater and a heater circuit and is provided with further control means coupled to said heater circuit and to said resonant converter oscillator circuit for limiting the A.C. output of said resonant converter oscillator circuit, said further control means being arranged to generate a control signal which temporarily limits said A.C. output while said heater is warming up.

11. A magnetron system as claimed in claim 7, wherein said magnetron is provided with a heater and a heater circuit and is provided with further control means coupled to said heater circuit and to said resonant converter oscillator circuit for limiting the A.C. output of said resonant converter oscillator circuit, said further control means being arranged to generate a control signal which temporarily limits said A.C. output while said heater is warming up.

12. A magnetron system as claimed in claim 5, further comprising additional rectifying means having a pair of A.C. input terminals and having a pair of D.C. output terminals coupled to said power supply terminals.

* * * * *